US012602705B2

(12) United States Patent
Golden et al.

(10) Patent No.: US 12,602,705 B2
(45) Date of Patent: Apr. 14, 2026

(54) USING PRINTED MAIL TO RETRIEVE CONSUMER INTEREST DATA

(71) Applicant: Quad/Graphics, Inc., Sussex, WI (US)

(72) Inventors: Joshua James Golden, Larchmont, NY (US); George Nicholas Forge, Milwaukee, WI (US); Jose Francisco Granados, Dallas, TX (US); Samuel Hamilton, Fox Point, WI (US); Brian M. Hollahan, Wheaton, IL (US); Mario Trafficante, Sussex, WI (US)

(73) Assignee: Quad/Graphics, Inc., Sussex, WI (US)

( * ) Notice: Subject to any disclaimer, the term of this patent is extended or adjusted under 35 U.S.C. 154(b) by 0 days.

(21) Appl. No.: 18/762,160

(22) Filed: Jul. 2, 2024

(65) Prior Publication Data

US 2025/0014065 A1 Jan. 9, 2025

Related U.S. Application Data

(60) Provisional application No. 63/525,415, filed on Jul. 7, 2023.

(51) Int. Cl.
| | |
|---|---|
| *G06Q 30/02* | (2023.01) |
| *G06K 7/14* | (2006.01) |
| *G06Q 30/0217* | (2023.01) |
| *G06Q 30/0251* | (2023.01) |

(52) U.S. Cl.
CPC ....... *G06Q 30/0218* (2013.01); *G06K 7/1417* (2013.01); *G06Q 30/0271* (2013.01)

(58) Field of Classification Search
CPC ....... G06Q 30/0218; G06Q 30/0207–30/0277; G06K 7/1417
See application file for complete search history.

(56) References Cited

U.S. PATENT DOCUMENTS

| | | | |
|---|---|---|---|
| 9,105,002 B2 | 8/2015 | Fitzsimmons | |
| 10,559,050 B2 | 2/2020 | Ashraf | |
| 2005/0060232 A1* | 3/2005 | Maggio | G06Q 30/0603 348/E7.071 |

(Continued)

FOREIGN PATENT DOCUMENTS

WO 2019222721 A1 11/2019

OTHER PUBLICATIONS

Using QR Codes in Email: Everything You Need to Know in 2024, printed from the Internet at https://www.rightinbox.com/blog/qr-codes-in-email on Mar. 9, 2023, 15 pages.

(Continued)

*Primary Examiner* — Thuy N Nguyen
(74) *Attorney, Agent, or Firm* — Becker Patent Law, LLC

(57) ABSTRACT

A system and method of using printed mail to retrieve consumer interest data includes printing a scannable code on a printed mail piece, sending the printed mail piece out for postal delivery to a consumer and receiving a request from a mobile device to access a server-based resource based on the consumer scanning the scannable code on the printed mail piece. The system and method includes providing access to the server-based resource, the server-based resource serving questions regarding consumer interests to the mobile device, and retrieving consumer interest data based on the responses of the consumer to the questions.

16 Claims, 7 Drawing Sheets

(56)        References Cited

U.S. PATENT DOCUMENTS

| | | | | |
|---|---|---|---|---|
| 2006/0190107 A1* | 8/2006 | Kassar | .................. | G06Q 30/02 |
| | | | | 700/90 |
| 2007/0265916 A1* | 11/2007 | Belanger | ........... | G06Q 30/0226 |
| | | | | 705/14.27 |
| 2010/0049598 A1* | 2/2010 | Burst | ................ | G06Q 30/0207 |
| | | | | 705/14.1 |
| 2013/0144710 A1* | 6/2013 | Roundtree | ........ | G06Q 30/0251 |
| | | | | 705/14.44 |
| 2013/0239104 A1* | 9/2013 | Savant | ................. | G06F 21/121 |
| | | | | 717/174 |
| 2016/0163237 A1 | 6/2016 | Petkovsek et al. | | |
| 2019/0043083 A1* | 2/2019 | Ornstein | ............... | G06Q 10/04 |
| 2021/0035170 A1* | 2/2021 | Guest | .............. | G06K 19/06178 |
| 2021/0357974 A1* | 11/2021 | Okamoto | ............. | G09F 3/0297 |
| 2022/0038757 A1* | 2/2022 | Ghavami | ............. | H04N 21/458 |
| 2022/0261843 A1 | 8/2022 | Kugler et al. | | |
| 2022/0261853 A1* | 8/2022 | Publicover | ......... | G06Q 30/0269 |
| 2022/0358520 A1* | 11/2022 | Dearing | ................ | G06Q 30/02 |
| 2022/0377424 A1* | 11/2022 | Deng | ................ | G06Q 30/0282 |
| 2024/0127295 A1* | 4/2024 | Matsushima | ....... | G06F 16/9566 |
| 2024/0303682 A1* | 9/2024 | Kusunoki | .......... | G06Q 30/0242 |
| 2024/0303688 A1* | 9/2024 | Kusunoki | .......... | G06Q 30/0255 |

OTHER PUBLICATIONS

QR Code Popularity is Changing: What Direct Mail Marketers Need to Know, printed from the Internet at https://www.msp-pgh.com/qr-codes-direct-mail/ on Mar. 9, 2023, 20 pages.

* cited by examiner

Fig. 2          210                                         200
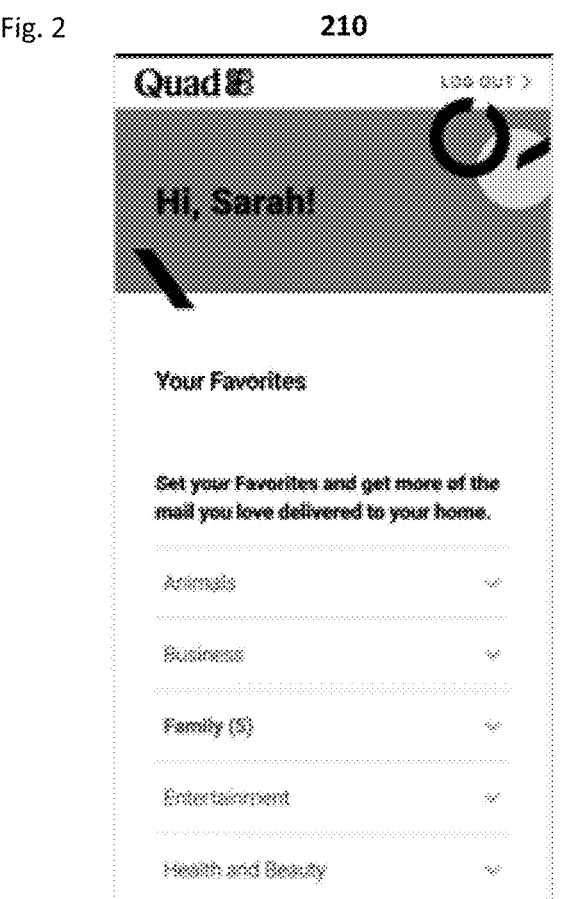

406    3P Data 404    2P Data 402    1P Data

408    Query sub. C1, I1

410    Propensity Score sub. C1, I1

Database    400

Fig. 5

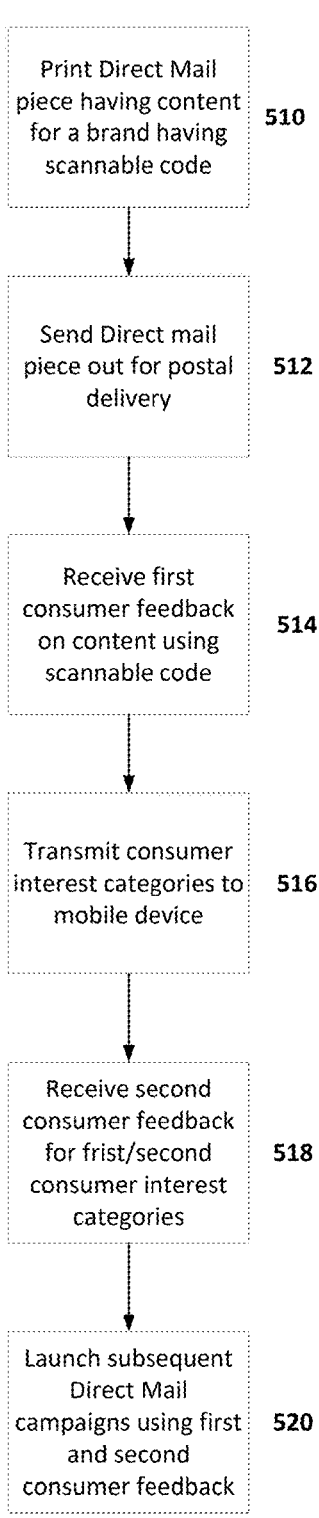

Print Direct Mail piece having content for a brand having scannable code   510

Send Direct mail piece out for postal delivery   512

Receive first consumer feedback on content using scannable code   514

Transmit consumer interest categories to mobile device   516

Receive second consumer feedback for frist/second consumer interest categories   518

Launch subsequent Direct Mail campaigns using first and second consumer feedback   520

600

Print Direct Mail piece having content for a brand   602

Deliver Direct Mail piece   604

Receive consumer feedback on the content   606

Remove Consumer from subsequent DM campaign   608

Print and deliver a second Direct Mail piece for a subsequent Direct Mail campaign   610

700

Provide database of categories and associated brands    702

Receive consumer feedback using scannable code    704

Identify categories based on feedback and store in consumer record    706

Select consumer for Direct Mail distribution based on record    708

Print and distribute second Direct Mail piece    710

USING PRINTED MAIL TO RETRIEVE CONSUMER INTEREST DATA

CROSS-REFERENCE TO RELATED APPLICATIONS

This application claims the benefit of U.S. Provisional Application No. 63/525,415, filed Jul. 7, 2023, which is incorporated by reference herein in its entirety.

BACKGROUND

Consumers have adopted a variety of algorithmically driven content across multiple mediums such as streaming video, music and social media. Consumers are increasingly demanding relevant content at the individual level and dynamically adjusted content based upon a variety of signals such as active participation, inaction, number of seconds engaged, clicks, bounce rate, likes, dislikes and ratings.

Direct mail received at a consumer's mailbox has lacked adequate feedback mechanisms. Brands and retailers are unable to see whether a consumer opened a letter, spent time looking through it, or just threw it in a recycling bin. Businesses spend significant time and marketing budget on sending direct mail without a wholistic understanding of how consumers are interacting with such direct mail. Additionally, cross brand or cross interest signals do not exist since there is no direct mail feedback platform. Thus, consumers lack the ability to personalize content they receive in their mailbox.

SUMMARY

A system and method of using printed mail to retrieve consumer interest data includes printing a scannable code on a printed mail piece, sending the printed mail piece out for postal delivery to a consumer and receiving a request from a mobile device to access a server-based resource based on the consumer scanning the scannable code on the printed mail piece. The system and method includes providing access to the server-based resource, the server-based resource serving questions regarding consumer interests to the mobile device and retrieving consumer interest data based on the responses of the consumer to the questions.

BRIEF DESCRIPTION OF THE DRAWINGS

FIG. 2 shows two exemplary screenshots on a mobile computing device, according to an illustrative embodiment.

FIG. 4 is a block diagram of a database of consumer interest data, according to an illustrative embodiment.

FIG. 5 is a flowchart showing a method of delivering printed mail pieces to a consumer, according to an illustrative embodiment.

DETAILED DESCRIPTION OF ILLUSTRATIVE EMBODIMENTS

In some embodiments, consumers may be empowered to control their physical, home mailbox like their streaming service or social platform.

In some embodiments, knowing how a consumer interacts with their direct marketing mail and what their interests are can lead to better advertising targeting.

In some embodiments, a source of mailbox and household data may be compiled. Brands may purchase first party data from this source and/or they may use consumer interest data retrieved using the methods and system described herein to enhance existing first party data and/or convert third party data to first party data.

In some embodiments, better direct mail targeting of households can be provided by creating an application (app) that tracks consumer engagement and leveraging that data to partner with brands to drive better mailbox content.

In some embodiments, a direct mail feedback platform may be provided.

In some embodiments, printers, publishers, and/or brand owners may move from customer mailbox profiles without a feedback mechanism to customer mailbox profiles with one or more direct feedback mechanisms.

In some embodiments, consumers will be empowered to receive more content they want and less content they do not want.

In some embodiments, consumers are enabled to provide feedback on the marketing mail they receive in their physical mailbox outside their home or business.

Figure 1:
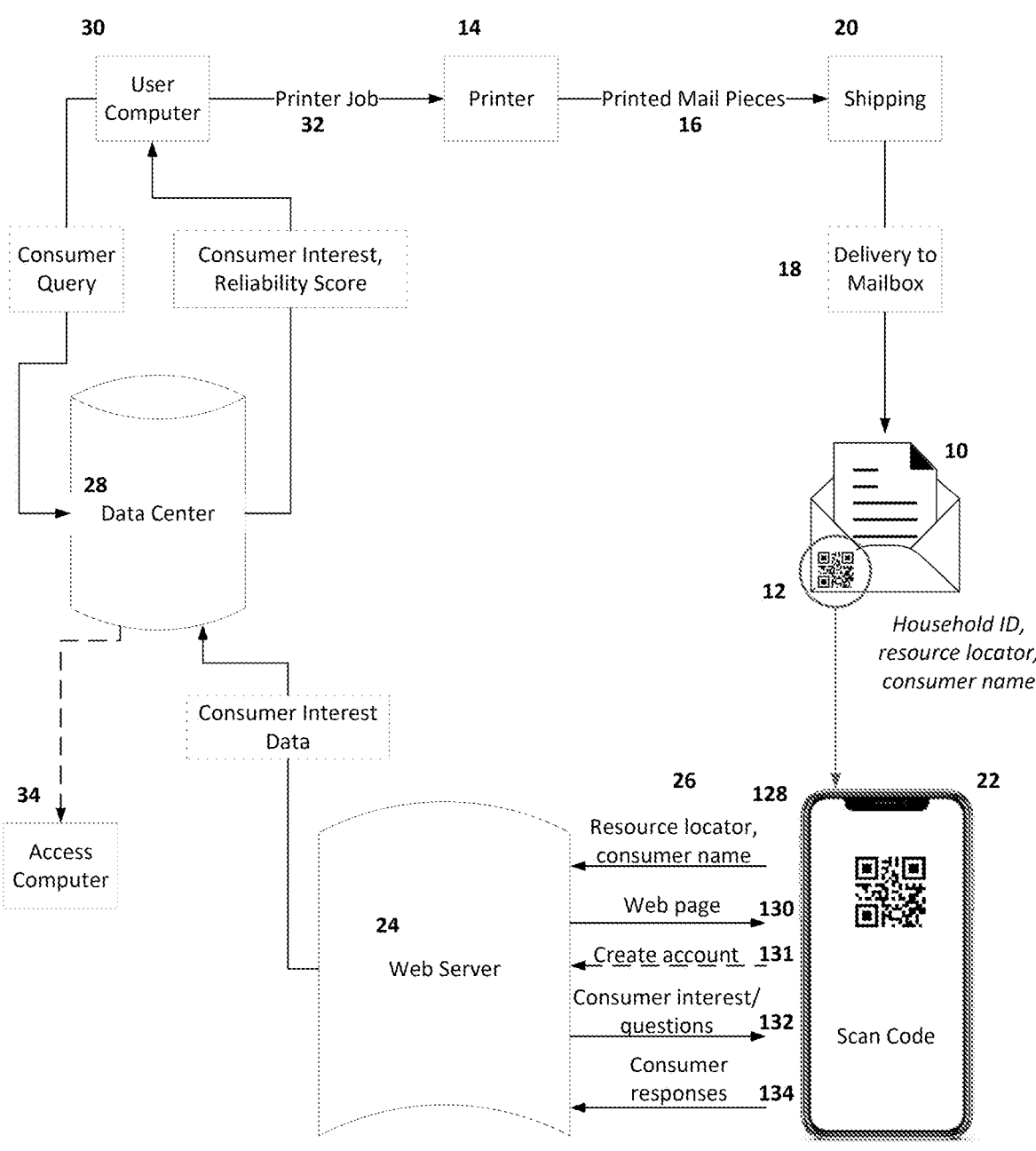
FIG. 1 is a schematic diagram of a system and method of using printed mail to retrieve consumer interest data, according to an illustrative embodiment.

Referring to FIG. 1, a computerized system and method of using printed mail to retrieve consumer interest data will be described. A printed mail piece 10 bearing a scannable code 12 is provided. The printed mail piece 10 may comprise a mail piece, such as a direct mail piece, which may be a solicited or unsolicited advertisement sent to a prospective customer through the mail. The printed mail piece 10 may comprise other printed items, such as a magazine or catalog subscribed to by a consumer at an address associated with a mailbox, an envelope, a printed postcard, etc. The mailbox may be associated with an address of a postal delivery service, such as the U.S. Postal Service or other carrier. Printed mail piece 10 may be a letter, a package or packaging, a postcard, a brochure, a flyer, or any of a wide variety of printed items that are delivered to a mailbox of a consumer.

A printer 14 may comprise a web offset printer, a laser printer, a digital printer, an inkjet printer or any other type of physical printing device configured to print mail pieces 16 for delivery 18 by way of a delivery service 20 to a mailbox. Printer 14 may be configured to print personalized information on the printed mail piece, such as consumer's name, consumer address, etc. Printer 14 may be configured to print fixed data on a plurality of mail pieces as well as variable data on the mail pieces, the variable data changing based on demographic data about the consumer and/or a household associated with the consumer.

Printer 14 may be configured to print scannable code 12 on printed mail piece 10 prior to delivery of printed mail piece 10. Scannable code 12 may comprise a barcode, quick response (QR) code, personalized QR code, or other machine-readable code. Scanning may include the use of an image capturing device (e.g., camera) for photo and/or video acquisition as well as scanning over wireless transmission such as in the case where the code is contained in a Near Field Communication (NFC) device, using Radio Frequency ID (RFID), etc. The code may comprise a code which is not readily readable by a person, such as a series of parallel lines of varying widths, an arrangement of pixels, etc. In the case of a personalized QR code, one or more personalized data may be encoded, such as a household ID (e.g., a numeric or alphanumeric code corresponding uniquely to a home, apartment, office, or other residence or place of business), a consumer name (e.g., first name and/or last name), e-mail address, mailing address, etc. Other non-personalized or fixed data may also be encoded by the personalized QR code, such as a resource locator (e.g., a uniform resource locator, web address, IP address, or other computer resource locator or resource address). A personalized QR code may encode personalized data and/or fixed data in different embodiments.

As shown in FIG. 1, a delivery service 20 performs the step of sending printed mail piece 10 out for postal delivery to a customer.

Printed mail pieces 10 can be printed by a printing entity (e.g., Quad/Graphics, Inc., Sussex, WI). Printed mail pieces can be printed on behalf of many different brand entities (e.g., News magazine, Clothing clothes store, Satellite Radio radio service, etc.) to generate marketing mail for consumers residing or working at locations associated with mailboxes. Brand entities may add the scannable code to the text and/or images printed on their printed mail pieces. In some embodiments, the printed mail piece having the scannable code can be used conveniently by a consumer to provide feedback on the mail piece itself and on the consumer's interests and/or disinterests back to a computing resource operated by the printing entity. This data can then be made available to one or more of the brand entities to assist them in formulating their direct marketing campaigns.

A mobile computing device 22 may comprise a smartphone, a cellular phone, a tablet computer, a laptop computer, a head-worn computing device such as a set of computerized glasses and/or any other computing device which can be carried, worn or used by a person. Computing device 22 may be handheld, such as a computer designed to be used while held in one hand, or may be larger like a laptop computer. Mobile computing device 22 may comprise a processing circuit configured to perform a variety of functions based on an operating system stored in memory. Mobile computing device 22 may be configured to download over a wireless network (e.g., a cellular network or other wireless network) applications from an app store operating on a remote server computer. One application may be an application for scanning code 12 and presenting content such as consumer interest questions, as will be described. Such an application would be downloadable by a consumer from an app store and an icon associated with the application may be displayed on a home screen of device 22 along with icons for launching other applications. Alternatively, device 22 may be configured to access a web application or web app using a resource locator from code 12 and a web browser operating on device 22. The web app may be hosted remotely on a web server by an entity, such as by the printing entity.

A web server 24 is shown in communication over a network with mobile computing device 22. Exemplary messages 26 are shown being communicated between web server 24 and device 22. At message 128, web server 24 is configured to receive a request from mobile device 22 to access a server-based resource. The request is generated by mobile device 22 based on the consumer scanning scannable code 12 on printed mail piece 10. For example, the request may comprise a resource locator directed to a web app or other server-based resource. In response, server 24 may provide access to the server-based resource by generating, as shown by message 130, one or more web pages or other data and transmitting the data to device 22. The data may be in a markup language format, such as Hypertext Markup Language, and/or in other formats. At an optional step, a message 131 may be sent from device 22 to web server 24 comprising data for a user to create an account on web server 24 or another computer associated with web server 24, as will be described hereinbelow. Message 132 comprises data relating to consumer interest questions that may be transmitted from web server 24 and served to device 22. Device 22 may be configured to display the consumer interest questions, receive consumer responses via one or more input devices on device 22 (e.g., on-screen keyboard, hard keys, microphone for voice input, etc.), and transmit consumer response data via message 134 for receipt by web server 24. In this manner, web server 24 may be configured to retrieve consumer interest data based on the responses of the consumer to the questions.

In some embodiments, printed mail piece 10 may further comprise a call to action to entice consumers to scan the code and/or give consumer interest data about the printed mail piece and/or other interest. The call to action may comprise a message identifying an offer for something of value which is available to the consumer after scanning the scannable code. The message may ask or invite the consumer to scan the code. In response to the desired consumer activity (scanning the code, providing consumer interest data, etc.), the system may be configured to provide an incentive to the consumer by displaying a coupon code on device 22, crediting an account associated with the consumer, providing access to content on device 22, or by other methods of providing an incentive or credit to the consumer. The printed mail piece 10 may be printed with one or more tag lines, such as "Like what you see? Scan here for more content" or "Scan here for special deals." In some embodiments, a method may comprise printing an indication of a reward, incentive, offer, call-to-action or other consideration on printed mail piece 10. In response to the responses of the consumer to the questions, the method may comprise providing a code associated with the reward to the consumer via display, e-mail, etc.

The consumer interest questions may comprise a list of categories and/or sub-categories of interests from which a consumer may select those of interest. For example, categories might include apparel, science, art, sports, outdoors, cooking, etc., and subcategories may for example be women's apparel, soccer, cooking French cuisine, etc.

FIG. 2 shows two exemplary screenshots on a mobile computing device, according to an illustrative embodiment. When a consumer receives a piece of mail in their mailbox, the consumer may use their mobile computing device to scan the code with the camera of the mobile computing device. In response, the device will launch a web application and display a landing page or first screen. First screen 200 may be served by the web app or local application to mobile computing device 22 in response to the consumer scanning the scannable code. The consumer's name 202 may be displayed. Name 202 may be obtained by the web app from personalized data encoded in the scannable code. Alternatively, the name may be obtained from another source on the phone or by lookup via the web app using the consumer's address or other personalized data. In any event, a personalized first screen 200 may be displayed, inviting the consumer to interact further with the web app, for example by receiving consumer interest questions and providing consumer interest responses. First screen 200 may provide a user input button 204 to receive a consumer input signal indicating the consumer wishes to proceed. Additional screens may then be received and displayed, such as screen 210, by the mobile computing device configured to allow the consumer to engage with and/or rate content, with or without creating an account. Screen 210 may provide consumer interest questions in the form of check boxes, hyperlinks, or drop-down menus to allow the user to select from among categories of interest, such as animals, business, family, entertainment, etc. Data from the session may be appended to the consumer's name, account, or other identifying data and sent to web server 24 for storage and further use.

In another example, first screen 200 may provide another user input button (not shown) associated with text asking whether the name provided is not correct. For example, the screen may display "Not Sarah?" and a hyperlink allowing a user to click through to another web page to update their personal information and/or create a user account.

One or more of the screens 200, 210, etc. may be branded with a look and feel using the printer entity's name (e.g., Quad) and/or a brand entity's name (e.g., Sirius XM). The screens may also provide log in and/or log out buttons to allow a consumer to log in and/or log out of an account on web app or otherwise associated with the platform.

In some embodiments, the mobile computing device 22 may be configured to remember a username and/or password associated with the web app so that if a subsequent printed mail piece is scanned in the future, device 22 will automatically display a first screen personalized according to the user account data.

Figure 3:
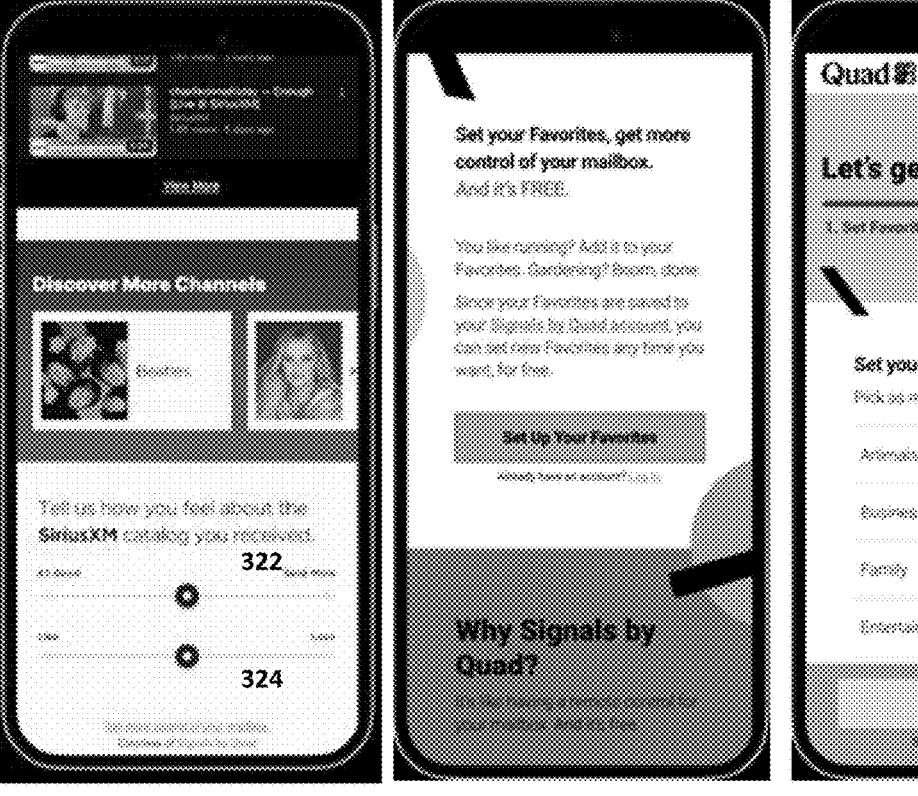
FIG. 3 shows three exemplary screenshots on a mobile computing device, according to an illustrative embodiment.
Figure 6:
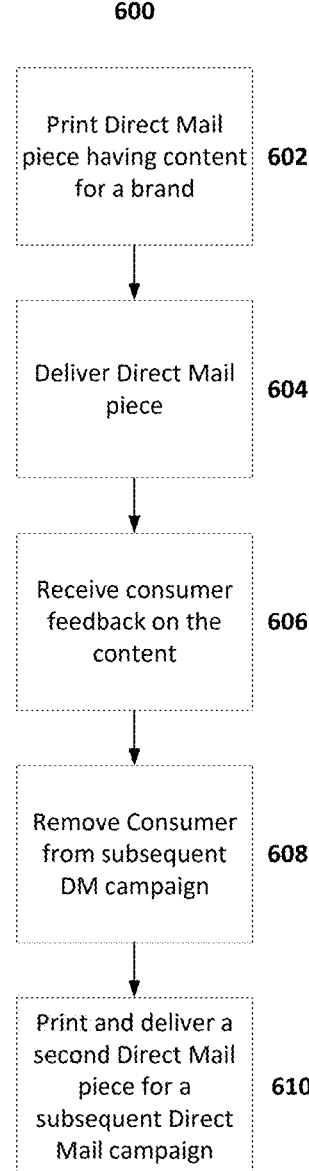
FIG. 6 is a flowchart showing a method of delivering printed mail pieces to a consumer, according to an illustrative embodiment.

Referring now to FIG. 3, additional exemplary screens are shown, illustrating additional optional features. A screen 300 is configured to receive consumer interest data and/or to allow a consumer to create an account, as shown by hyperlink 302. Device 22 may be configured to receive one or more favorite categories of interest, such as family, entertainment, etc. Additional screens of interests may be displayed using a Next button 304.

A screen 310 is another example of a screen, which may be a landing page or first screen. A button 312 may be selected by a user (via touchscreen) to begin a process of setting up favorite consumer interests.

A screen 320 is another example of a screen, which may be a landing page or first screen. An input device in the form of a slider 322 may be used to receive a user's rating or input regarding the printed mail piece or content on the printed mail piece which was just received. The consumer may be able to select from at least two, at least three, or more than three different options, such as "All good," "Send More," "Send Less," etc. The consumer may be able to select other consumer interest options, such as different levels of how the content of the printed mail piece is liked, such as Like, Love, Don't Like, etc., using slider 324. The consumer may be able to rate or give a rating to the marketing mail received, such as on a scale of 1 to 10, zero to 1, etc. The web app may be configured to serve other content as well, such as sample content, a branded web page, etc., that a user can interact with. The other content may be a microsite where consumers can learn more about the brand and/or exclusive content. Web pages may be branded with the printer entity and/or with the brand associated with the printed mail piece. The web app may be configured to display a web page on the mobile computing device having a brand that matches a brand printed on the printed mail piece. Clicks, interactions, time spent on the branded web page, coupon engagement, coupon redemption and/or other consumer engagement metrics associated with consumer engagement with the content served by the web app may be stored, to further annotate a consumer interest data file, while allowing a consumer to opt-out of any click tracking.

In one example, a consumer may first be shown screen 320 which is configured to receive consumer response data regarding the content of the printed mail piece that was scanned. After submitting the response data, the web app may be configured to serve another screen to solicit other interest data which may not be related to content of the printed mail piece that was scanned, such as the categories shown in screen 210 and/or screen 300. In an alternative embodiment, the screens may be served in reverse: first the list of consumer interest categories and then, in a subsequent screen, the sliders or other input devices for receiving feedback regarding the printed mail piece that was scanned.

In some embodiments, the web app may be configured to receive consumer interests using a microphone of the mobile computing device to receive spoken responses. The web app may be configured to cause the mobile computing device to generate a spoken question over a speaker such as "How do you feel about this catalog?" and then use a microphone of the mobile computing device to receive a voice or spoken response. Alternatively, the web app may display a question or prompt and then activate the microphone to receive the response. The web app may be configured to use a speech recognition engine to convert the received response to text data. A further module may be used to classify the received response data into one of a plurality of categories indicating a level of interest (high, medium, low, etc.) based on the text data. In various embodiments, the web app may be configured to receive spoken responses from a consumer and send consumer interest data to web server 24 based on the received spoken responses.

In some embodiments, the web app may be configured to facilitate creation of user accounts for different consumers. In some embodiments, the web app can perform functions without the need for a complete account, for example, in the case where a personalized code is used to identify a household ID and/or individual consumer living at the household. In some embodiments, the web app may be integrated with single sign-on (SSO) systems, such as those provided by Google, Inc., Apple, Inc. and Meta Platforms, owner of Facebook. The web app may further be configured to prompt a user to create an account by receiving a username and/or password from the user and storing the username and/or password in association with a user account. Additional information may be solicited from the consumer to generate the user account, such as first name, last name, email address, mailing address, zip code, city, state, and/or date of birth, etc. In some cases, this information will have been previously stored at a data center 28 (FIG. 1) in communication with web server 24. Data center 28 may be a server computer configured to store consumer data, such as personalized consumer data or household data and optionally consumer interest data, consumer magazine and/or catalog subscriptions, and even user data imported from electronic media platforms. Data center 28 may store consumer data as a consumer profile or a set of signals associated with the consumer. Consumers may send signals to brand owners based on data stored in data center 28. Once a user account is created, consumer interest data may be stored in association with the account. The web app may further be configured to allow the user to change or update their consumer interest data using mobile computing device 22.

Figure 4:
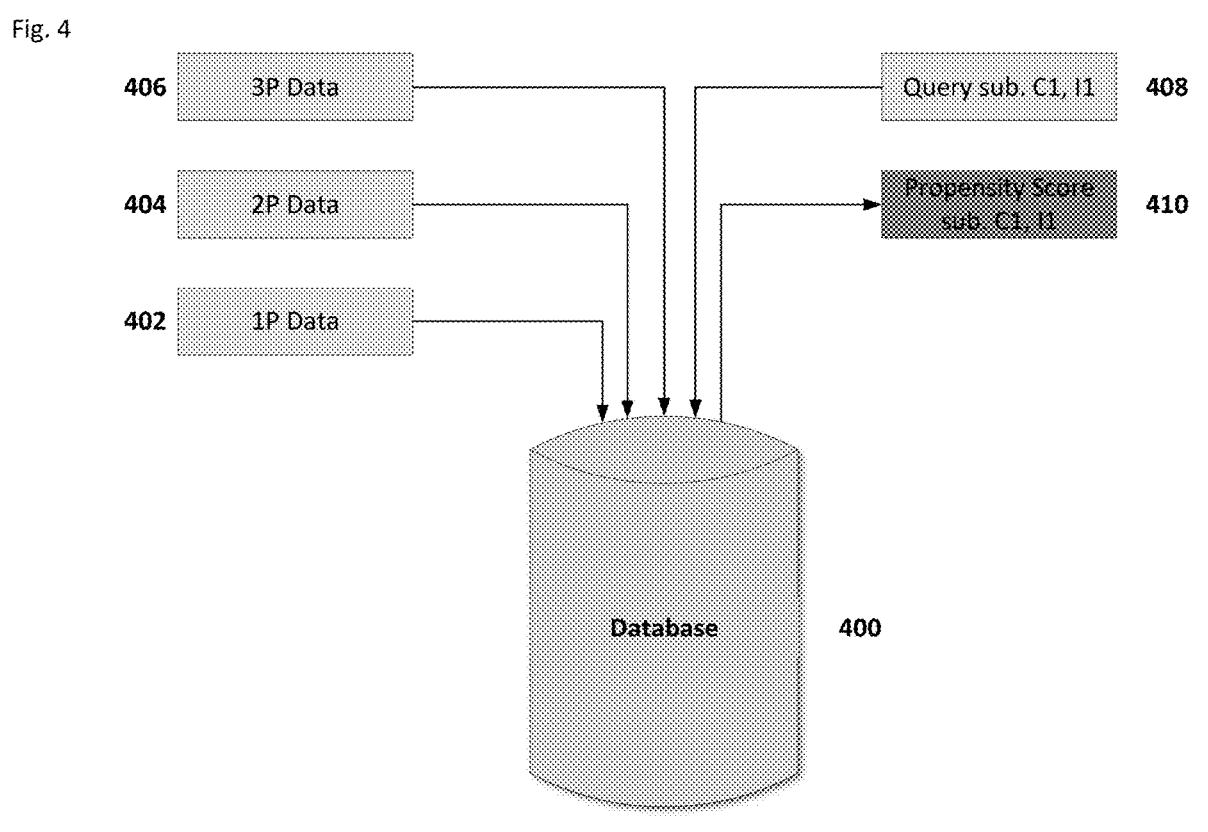

FIG. 4 is a block diagram of a database storing consumer interest data, according to an illustrative embodiment. A database 400 is configured to store data from a plurality of sources 402, 404, 406. In one example, database 400 may be operated by a printing entity operating web offset printers, laser printers, inkjet printers, and/or printers of other types for printing direct mail, magazines, catalogues, and other printed mail pieces. The printing entity may print and/or publish printed mail pieces for hundreds or thousands of different brands. As such, the printing entity may use database 400 to compile data about consumers or recipients of the printed mail pieces. Consumers or recipients may have the ability to opt-out of or opt-in to the collection of such data. If a person subscribes to magazines relating to sports, database 400 may be configured to store "sports" as a category of interest to the person. Database 400 may further be configured to store a propensity score indicating a person's inclination to be interested in sports. Alternatively, or in addition, a reliability score may be stored indicating the likelihood that sports is an interest of the consumer. For example, first party data 402 may indicate that the consumer has subscriptions to three or more sports-related publications, indicating a strong propensity for sports. Data received from a second party source 404, such as from a brand owner associated with a branded item being printed and/or published, may raise a reliability score. If both the second party source and the first party source indicate the consumer has an interest in sports, then "sports" is a more reliable interest than if only one source indicated the interest in sports.

Third party data 406 may be retrieved from other sources, such as from web browsing history, social media accounts, interest surveys conducted by third parties, etc. This third party data 406 may further be deposited in database 400 to further effect propensity scores and/or reliability scores for each consumer.

Propensity scores and/or reliability scores may be scored on any number of different scales or ranges, such as on a scale of 0 being no propensity (or reliability) and 1 being the highest propensity (or reliability). Thus, a consumer having a propensity score of 0.5 for sports might have an average interest in sports, and a consumer having a reliability score of 0.9 for this propensity might have an above-average reliability that this propensity score is accurate (for example, in the case where the "average" interest in sports was confirmed from multiple data sources or channels).

Propensity cores and/or reliability scores may be stored based on individual consumers in a household or based on the household itself. For example, if one member of the household is interested in sports and another member of the household is interested in cooking, data center 28 may be configured to store sports and cooking as interests associated with a unique household identifier.

Database 400 may be configured to receive a query 408 from another computer. Query 408 may be a general query for all consumer interest data for a particular consumer C1. Query 408 may further be a query for a propensity score (or alternatively a reliability score) for a particular consumer C1 and a particular interest I1. A response 410 may be retrieved by the computer from the database 400 which contains the requested information. This information may be used as targeting information for the consumer. This request-and-response method can be used to build direct mail marketing campaigns to better target consumers of interest and avoid wasting paper, ink, and delivery charges on consumers not likely to have an interest in a particular category or subcategory.

Referring again to FIG. 1, consumer interest data retrieved using web server 24 may be transmitted to data center 28 (or database 400) as another source of consumer interest data similar to sources 402, 404 and 406 to improve the robustness of data in data center 28. Thus, the platform described may use the retrieved consumer interest data to improve a reliability score and/or a propensity score associated with the first consumer interest data. A user computer 30 may be configured to handle the request-and-response described with reference to FIG. 4 and the assembly of a print job 32 to carry out a direct mail marketing campaign. User computer 30 may be used by an analyst or marketer to establish a mailing strategy based on data from the data center 28 and/or consumer activity captured by web server 24.

As can be seen from FIG. 1, future printed mail pieces 16 which are printed according to printer job 32 may also bear scannable codes, thereby allowing a consumer to further improve the feedback mechanism to further personalize printed mail pieces received in the consumer's mailbox. The feedback mechanism may also update consumer interests based on a consumer's changing interest, based on changing direct mail marketing messages, etc.

FIG. 1 also shows an optional access computer 34 which may be provided with access to data center 28. For example, an access interface may be provided at data center 28 to allow brand owners or other second parties, or even third parties, access to data center 28 on a fee basis or other remuneration basis. Advantageously, brand owners may benefit from gaining prospects for future re-targeting campaigns that were not in the brand's initial promotion.

Referring now to 1G. 6, a computerized method 600 of delivering printed mail pieces to a consumer will be described. At a block 602, direct mail pieces are printed having content for a brand, each direct mail piece having a scannable code printed thereon. The direct mail pieces may be printed using a physical printer, such as one or more of a web offset printer, laser printer, inkjet printer, etc. The direct mail pieces may be printed with images and/or text associated with a brand of a product and/or service. Some portions of the direct mail pieces may be printed with fixed data, such as an advertisement, while other portions may be printed with variable data, such as a mailing address, or content which changes depending on the intended recipient. The direct mail pieces may comprise paper, plastic, cardboard, and/or other materials upon which images and/or text are printed.

At block 604, the direct mail pieces are delivered. Delivery may occur by way of trucks used by the U.S. Postal Service, or another delivery service. The printed mail pieces may be delivered directly to mailboxes associated with each intended recipient and potential consumer of a product referenced by the direct mail piece.

At block 606, consumer feedback on the content of the printed mail piece may be received. The consumer feedback may be received by a computing device, such as a mobile computing device, a web application or other application operable on a computing device, a server computer, a data center associated with the entity printing at block 602, or another computer. The consumer feedback may be received after a consumer has read a call to action or other message on the printed mail piece, scanned the scannable code with the consumer's mobile computing device, received a web page soliciting consumer feedback, and then receiving consumer feedback by way of an input device on the mobile computing device. The mobile computing device may then be configured to send the consumer feedback to a server computer over a network.

At block 608, the printing entity prepares a subsequent direct mail campaign comprising direct mail pieces. In this case, the consumer may be removed from the list of recipients for the subsequent direct mail campaign for the same brand as in the previous direct mail campaign. The consumer may be removed from the subsequent direct mail campaign because the consumer feedback indicates the user has an insufficient interest level to receive further direct mail associated with the brand. At a block 610, the consumer may be removed from a second subsequent direct mail campaign based on at least one of an improved propensity score and/or reliability score. At block 610, the method may include printing a second direct mail piece for a second brand according to the second subsequent direct mail campaign sending the second direct mail piece out for delivery (e.g., postal delivery or using another delivery service) to a second consumer. As a result, the cost of direct mail campaigns can be reduced by removing from the recipient list those consumers who are less interested in the brand's offering and/or the mail medium.

In another embodiment, block 608 can be replaced with a block retaining the consumer as a recipient in the subsequent direct mail campaign based on the consumer having a sufficient level of interest in the brand (e.g., the consumer "Likes" or "Loves" the brand and/or content received). As a result, a more engaging experience can be created for consumers by providing additional offers, content and even links to web properties.

In another embodiment, the method may further comprise serving a list of consumer interest categories to the mobile computing device and receiving second consumer feedback on the consumer interest categories at a server computer.

In another embodiment, the method may further comprise storing first consumer interest data based on a consumer's subscriptions to printed mail pieces (or based on the consumer's receipt of printed mail pieces, regardless of subscription) associated with a plurality of different brands. This consumer interest data may be stored in a data center or other computing device.

The consumer interest data may comprise one or more categories and/or subcategories of consumer interest, Each consumer interest category and/or subcategory may have a corresponding propensity score and/or a corresponding reliability score. Other scores are contemplated. The method may further comprise using received second consumer feedback (in response to consumer interest categories served to the mobile computing device) to improve reliability scores and/or propensity scores associated with the first consumer interest data. Data from second consumer feedback may be aggregated with first consumer interest data.

Advantageously, the consumer interest data stored in the data center can have improved depth, breadth, reliability and/or predictive capabilities. The consumer interest data may be made more robust. The consumer interest data may provide a profile associated with a household, mailbox, and/or individual consumers associated with the household or mailbox.

Referring now to FIG. 5, another illustrative computerized method of delivering printed mail pieces to a consumer will be described. At a block 510, the method comprises printing a direct mail piece having content for a brand. The content may comprise text, graphics, images, coupons, or other content printed on the direct mail piece relating to a brand, such as Clothing clothes store, Outdoors recreational equipment, Satellite Radio satellite service, etc. At a block 512, the method may comprise sending the direct mail piece out for postal delivery to a consumer. The user may use a mobile computing device to scan the scannable code encoding a resource locator for a web app, or for downloading an application, or otherwise for accessing a server-based resource. In the case of a web app, the web app may serve a page to the mobile device to facilitate receiving consumer feedback on the content for the brand. The page may comprise text, radio buttons, sliders, a web form, text fields, etc. For example, the page may state "do you like this offer from [brand]?" The consumer may select "dislike" or "send less," which is coded as first consumer feedback data and sent through the mobile computing device to the server that served the page, as shown at block 514.

At a block 516, the method may comprise the server transmitting one or a plurality of consumer interest categories to the mobile computing device. The categories may comprise text and/or images describing a category (e.g., outdoors, cooking, etc.), and/or subcategories within each category (e.g., climbing, cycling, etc.). The categories may be served with user input fields to retrieve from the consumer second consumer feedback indicating an interest in one or a plurality of the consumer interest categories. At a block 518, this second consumer feedback data is received by the server.

At a block 520, additional subsequent direct mail campaigns can be launched, planned, constructed, etc. In one example, the consumer who provided the first and second consumer feedback data may be removed from a subsequent direct mail campaign for the brand based on the received consumer feedback For example, if the user selected "dislike" or "send less" for the brand relating to horseback riding, a subsequent direct mail campaign for products and/or service provided by a horseback riding brand will omit the consumer from the list of recipients for direct mail pieces. In another example, the consumer who provided the first and second consumer feedback data may be added to a second direct mail campaign related to the first consumer interest category and a third direct mail campaign related to the second consumer interest category. For example, if the consumer indicated an interest in climbing and cycling, the second direct mail campaign for a brand in the category of climbing and cycling will add the consumer to the list of recipients of direct mail pieces. Also, a third direct mail campaign for a brand in the category of cycling may also add the consumer to the list of recipients of direct mail pieces.

In additional optional steps, the consumer feedback can be combined with preexisting consumer interest data for the consumer, such as a consumer's subscriptions to printed mail pieces associated with a plurality of different brands. The consumer feedback and second consumer feedback can be used to improve reliability scores and/or propensity scores associated with the preexisting consumer interest data for the consumer.

In additional optional steps, the improved reliability scores and/or propensity scores may be used to remove the consumer from a second subsequent direct mail campaign, after which the second direct mail pieces for a second, different brand, may be printed according to the second subsequent direct mail campaign. The second direct mail pieces may then be sent out for postal delivery to a second consumer.

In some embodiments, a direct mail feedback platform may be provided comprising printed direct mail pieces a plurality of different product and/or service brands, each printed direct mail piece comprising a scannable code. The printed direct mail pieces may be for at least five, at least 20, at least 50, at least 100, or other numbers of different product and/or service brands. The platform may further comprise a mobile computing device configured to scan the scannable codes of the printed direct mail pieces, retrieve consumer interest data from a touch screen of the mobile computing device, and transmit the consumer interest data to a remote server computer. The platform may further comprise a remote server computer configured to aggregate the consumer interest data with second consumer interest data from other sources. The platform may further comprise another computer configured to query the remote server computer and use query results to build a direct mail campaign comprising second printed mail pieces to be delivered to consumers based on the aggregated consumer interest data and second consumer interest data.

The other sources providing data to the remote server computer may comprise a database of subscriptions the consumer has to printed mail delivered to the consumer's mailbox. The other sources may further comprise a source of consumer interaction data with web pages on the Internet.

In some embodiments, the retrieved consumer interest data from the touch screen may indicate the consumer's interest level in one of the product and/or service brands associated with the printed direct mail piece which was scanned.

In some embodiments, as a consumer interacts with additional content served by the web app, the content may refresh the consumer interests and serve additional content based on the refreshed consumer interests. For example, if a user is presented with a satellite radio page and the user indicates they are not interested in satellite radio but they are interested in sports, the web app may be configured to then offer the consumer content pages relating to a sports brand.

In some embodiments, the content served to the user may comprise a social media page or account associated with a brand.

Figure 7:
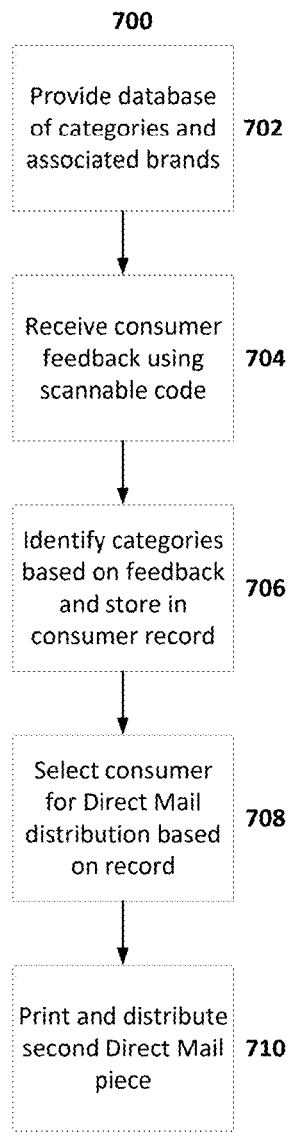
FIG. 7 is a flowchart showing a computerized method of a recommendation engine, according to an illustrative embodiment.

Referring now to FIG. 7, a computerized method of matching consumer interests to brands for direct mail campaigns will be described, according to illustrative embodiments. One or more of the features described hereinabove may be used with the methods described with reference to FIG. 7, and vice-versa. At a block 700, a database is provided of a plurality of categories and a plurality of brands associated with different ones of the categories. The database may comprise or more computing devices, server computers, or portions thereof, configured to store the categories and associated brands. For example, categories may comprise one or more of sports, cooking, and outdoors, Brands associated with or linked with sports may comprise "Sports Magazine, Inc.," "Tennis Weekly," etc. Brands associated with cooking may comprise "French Cuisine Magazine," "Baking Made Easy," etc. The database may be in the form of a recommendations engine configured to receive queries and in response make recommendations for consumers having interests in categories.

The database may be built in any number of different ways. For example, a list of categories may be compiled manually and/or by using an industry standard list. Associations or links between brands and the categories may be made manually and/or using an industry standard categorization list. In some embodiments, categories may comprise subcategories. For example, the Sports category may comprise sub-categories including Exercise and Fitness, Indoor Games, Outdoor Recreation, etc. Brands may be aligned with categories and/or subcategories and stored as part of a recommendations engine.

At a block 704, consumer feedback may be received to create records for each of a plurality of consumers associating, linking, or aligning each consumer with categories and/or subcategories. At a block 706, one or more of the plurality of categories may be identified based on the consumer feedback and the identification of the category may be stored in a record associated with the consumer. In one example, consumer feedback may be received using one or more steps described herein above, for example with reference to FIG. 1. Consumer feedback on content of a direct mail piece may be received based on a consumer scanning a scannable code on the direct mail piece with a mobile computing device and sending the consumer feedback through the mobile computing device. In other embodiments, consumer feedback or consumer interest data may be received through other channels, such as through a social media channel, an internet browsing channel, a print mail subscription channel listing subscriptions to print mail and/or categories thereof associated with consumers, etc. One result can be records stored in the database for consumers and categories and/or subcategories aligned with the consumer's interests. The categories may be weighted based on the source of the consumer interest data. For example, if a consumer reports they like a direct mail piece they have just scanned, this interest may be weighted higher than if a consumer interacted with a brand on a web page during an internet browsing session. Also, multiple interactions can be stored in the records, such as a user having 20 clicks or likes associated with a sub-category of Exercise & Fitness, 40 clicks or likes associated with a sub-category of Indoor Games and 20 clicks or likes associated with Outdoor Recreation. In this way, a strength or affinity score can be derived to indicate how strong the association is between the consumer and the category of interest.

In some embodiments, a recommendation engine may be seeded with results of a survey that lets consumers set category preferences to gather initial consumer data about the direct mail the consumer received. The survey may have at least two parts: one part of the survey will request from a consumer a rating of a specific direct mail material that led the consumer to the source of the survey, such as an application, web app, etc. A second part of the survey may comprise receiving consumer feedback on their interest and/or interest levels in each of a plurality of other categories of products they would like to see more of in their mailbox. In some embodiments, the recommendations engine may be used by an application to align brands with recommended recipients of direct mail for those brands.

In various embodiments, the identification of the category based on the consumer feedback may be stored as a new association of the consumer with the category (Jose Granados likes Sports) or as an increase in an affinity score or other score associated with the category (Jose Granados had 10 likes for Sports and now has 11 likes for Sports), or in some other manner.

At a block 708, a direct mail campaign or distribution may be created or planned by selecting one or more consumers for inclusion in the direct mail distribution based on the identifications stored in the records associated with the consumers. For example, all consumers having an interest in Sports may be selected for the direct mail distribution. In another example, all consumers having at least 5 clicks or Likes for Sports can be selected for the direct mail distribution.

At a block 710, the computerized method may comprise printing and/or distributing second direct mail pieces to consumers according to the direct mail distribution planned at block 708.

In some embodiments, the method may further comprise transmitting a plurality of the categories to the mobile computing device and receiving second consumer feedback indicating interests in other categories beyond those which are the subject of the direct mail piece scanned by the consumer. These may be first, second, third categories, etc. The record for the consumer may then be updated, annotated, or improved using this second consumer feedback.

With improved consumer records, consumers may be removed from and/or added to subsequent direct mail campaigns for brands. For example, a consumer who receives a direct mail piece in the category of Sports may provide consumer interest data showing a dislike for Sports. After being fed additional interest categories, the consumer may provide consumer interest data indicating a Like for Cooking. In subsequent direct mail campaigns for a first brand associated with Sports and a second brand associated with Cooking, the consumer may be removed or omitted from the first brand's direct mail campaign or distribution and added to the second brand's direct mail campaign or distribution.

In some embodiments, the identified one or more of the plurality of categories are stored in the record as recommended categories for the consumer.

In some embodiments, the computerized method may comprise storing in consumer records a number of times a consumer liked a category and a number of times the consumer disliked the category. The likes and/or dislikes may further be stored for each of a plurality of subcategories within the category.

In some embodiments, a direct mail feedback platform comprises printed direct mail pieces for a plurality of different product and/or service brands, each printed direct mail piece comprising a scannable code. The platform further comprises a mobile computing device configured to scan the scannable codes of the printed direct mail pieces, retrieve consumer interest data from a touch screen of the mobile computing device, and transmit the consumer interest data to a remote server computer, the remote server computer configured to aggregate the consumer interest data with second consumer interest data from other sources, A user computer is configured to query the remote server computer and use query results to build a direct mail campaign comprising second printed mail pieces to be delivered to consumers based on the aggregated consumer interest data and second consumer interest data.

The direct mail feedback platform may comprise wherein the other sources comprise a database of subscriptions the consumer has to printed mail delivered to the consumer's mailbox. The direct mail feedback platform may comprise wherein the other sources comprise a source of consumer interaction data with web pages on the Internet. The direct mail feedback platform may comprise wherein the scannable code comprises a personalized QR code which encodes a household identifier unique to a house address. The direct mail feedback platform may comprise wherein the scannable code encodes a consumer name and a uniform resource locator for a web app. The direct mail feedback platform may comprise wherein the retrieved consumer interest data from the touch screen indicates the consumer's interest level in one of the product and/or service brands associated with the printed direct mail piece which was scanned. The direct mail feedback platform may comprise wherein the printed direct mail piece which was scanned further comprises a printed call-to-action to entice the consumer to scan the printed direct mail piece. The direct mail feedback platform may comprise wherein the printed direct mail pieces are for at least five different product and/or service brands in a brand category.

In some embodiments, a computerized method of delivering printed mail pieces to a consumer may comprise printing a direct mail piece having content for a brand, the direct mail piece having a scannable code; sending the direct mail piece out for postal delivery to a consumer; receiving consumer feedback on the content for the brand based on the consumer scanning the scannable code with a mobile computing device and sending the consumer feedback through the mobile computing device; transmitting a plurality of consumer interest categories to the mobile computing device; receiving second consumer feedback indicating an interest in a first and a second of the consumer interest categories; removing the consumer from a subsequent direct mail campaign for the brand based on the received consumer feedback; and adding the consumer to a second direct mail campaign related to the first consumer interest category and a third direct mail campaign related to the second consumer interest category.

The computerized method may further comprise storing first consumer interest data based on a consumer's subscriptions to printed mail pieces associated with a plurality of different brands; and using the received consumer feedback and second consumer feedback to improve reliability scores and/or propensity scores associated with the first consumer interest data. The computerized method may further comprise removing the consumer from a second subsequent direct mail campaign based on at least one of the improved reliability scores and/or propensity scores; printing a second direct mail piece for a second brand according to the second subsequent direct mail campaign; and sending the second direct mail piece out for postal delivery to a second consumer.

In some embodiments, a computerized method of matching consumer interests to brands for direct mail campaigns comprises providing a database of a plurality of categories and a plurality of brands associated different ones of the categories; receiving consumer feedback on content of a direct mail piece based on a consumer scanning a scannable code on the direct mail piece with a mobile computing device and sending the consumer feedback through the mobile computing device; identifying one or more of the plurality of categories based on the consumer feedback and storing the identification in a record associated with the consumer; selecting the consumer for inclusion in a direct mail distribution based on the identification stored in the record associated with the consumer; and printing and distributing a second direct mail piece to the consumer according to the direct mail distribution.

The computer method may further transmit a plurality of the categories to the mobile computing device; receiving second consumer feedback indicating interests in a first and a second of the categories; and updating the record for the consumer based on the second consumer feedback. The computerized method may further comprise removing the consumer from a subsequent direct mail campaign for a brand based on the received consumer feedback; and adding the consumer to other subsequent direct mail campaigns for brands associated with the first and second categories. The computerized method may further comprise wherein the database further comprises subcategories within each of a plurality of the categories. The computerized method may further comprise wherein the identified one or more of the plurality of categories are stored in the record as recommended categories for the consumer. The computerized method may further comprise storing in the record a number of times a consumer liked a category and a number of times the consumer disliked the category, wherein the likes and dislikes are stored for each of a plurality of subcategories within the category. The computerized method may further comprise receiving additional consumer interest data from a social media source and/or from an internet browsing source and updating the identified one or more plurality of categories based on the additional consumer interest data. The computerized method may further comprise presenting a slider user interface element on the mobile computing device to receive the consumer feedback on the content of the direct mail.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Some embodiments are within the scope of the following claims.

What is claimed is:

1. A computerized method of using printed mail to retrieve consumer interest data, comprising:

printing a scannable code on a printed mail piece;

sending the printed mail piece out for postal delivery to a consumer;

receiving a request from a mobile device to access a server-based resource based on the consumer scanning the scannable code on the printed mail piece;

providing access to the server-based resource, the server-based resource serving questions regarding consumer interests to the mobile device;

retrieving consumer interest data based on the responses of the consumer to the questions;

collecting first consumer interest data in the server-based resource, the first consumer interest data based on a consumer's subscriptions to printed mail pieces associated with a plurality of different brands; and using the retrieved consumer interest data to improve a reliability score associated with the first consumer interest data, the reliability score stored in the server-based resource.

2. The computerized method of claim 1, further comprising:

providing an access interface to the first consumer interest data having the improved reliability score, wherein access is provided to an access computer to allow brand owners or third parties to access the first consumer interest data having the improved reliability score on a fee basis.

3. The computerized method of claim 1, further comprising: printing an indication of a reward on the printed mail piece; and in response to the responses of the consumer to the questions, providing a code associated with the reward to the consumer.

4. A system for using printed mail to retrieve consumer interest data, comprising:

a printed mail piece comprising a scannable code;

a mobile computing device comprising an image capturing device and configured to scan the scannable code and transmit a resource locator to a web server;

a web server configured to receive the resource locator and to transmit to the mobile computing device a web page comprising consumer interest questions, the mobile computing device configured to display the web page comprising consumer interest questions and to receive from a consumer responses to the consumer interest questions, the web server configured to receive the consumer responses;

a data center comprising first consumer interest data based on a consumer's subscriptions to printed mail pieces associated with a plurality of different brands, the data center configured to receive consumer interest data based on the consumer responses from the web server and to use the received consumer interest data to improve reliability scores associated with the first consumer interest data;

a printer configured to print a second printed mail piece according to a direct mail campaign, the direct mail campaign omitting one or more consumers based on the improved reliability scores of the first consumer interest data; and a delivery service configured to send the second printed mail piece for postal delivery to a customer.

5. The system of claim 4, wherein the printed mail piece comprises at least one of an envelope, a printed postcard, a catalog, and a magazine.

6. The system of claim 4, wherein the resource locator is a uniform resource locator for a web app.

7. The system of claim 6, wherein the consumer interest questions comprise at least one question about whether a consumer wishes to receive more or less of a content of the printed mail piece.

8. The system of claim 7, wherein the web app is configured to, after receiving a consumer response to the question about the content of the printed mail piece, display a plurality of consumer interests for selection by the consumer.

9. The system of claim 8, wherein the web app is configured to display a web page on the mobile computing device having a brand that matches a brand printed on the printed mail piece.

10. The system of claim 4, wherein the scannable code comprises a personalized QR code encoding a resource locator and at least one of a household identifier and a consumer name.

11. The system of claim 4, wherein the printed mail piece comprises a message identifying an offer available to the consumer after scanning the scannable code.

12. The system of claim 6, wherein the web app is configured to serve a branded web page to the mobile computing device, wherein the web app is configured to receive consumer engagement metrics comprising at least one of click throughs, time spent on the branded web page, coupon engagement, and coupon redemption.

13. A computerized method of delivering printed mail pieces to a consumer, comprising:

printing a direct mail piece having content for a brand, the direct mail piece having a scannable code;

sending the direct mail piece out for postal delivery to a consumer;

receiving consumer feedback on the content for the brand based on the consumer scanning the scannable code with a mobile computing device and sending the consumer feedback through the mobile computing device;

removing the consumer from a subsequent direct mail campaign for the brand based on the received consumer feedback; and after receiving consumer feedback on the content for the brand, serving a list of consumer interest categories to the mobile computing device; and receiving second consumer feedback on the consumer interest categories at a server computer.

14. The computerized method of claim 13, further comprising:

storing first consumer interest data based on a consumer's subscriptions to printed mail pieces associated with a plurality of different brands; and using the received second consumer feedback to improve reliability scores associated with the first consumer interest data.

15. The computerized method of claim 14, further comprising:

removing the consumer from a second subsequent direct mail campaign based on at least one of the improved reliability scores;

printing a second direct mail piece for a second brand according to the second subsequent direct mail campaign; and sending the second direct mail piece out for postal delivery to a second consumer.

16. The computerized method of claim 13, further comprising:

printing a second direct mail piece for the brand according to the subsequent direct mail campaign; and sending the second direct mail piece out for postal delivery to a second consumer.

\* \* \* \* \*